Patented Nov. 13, 1934

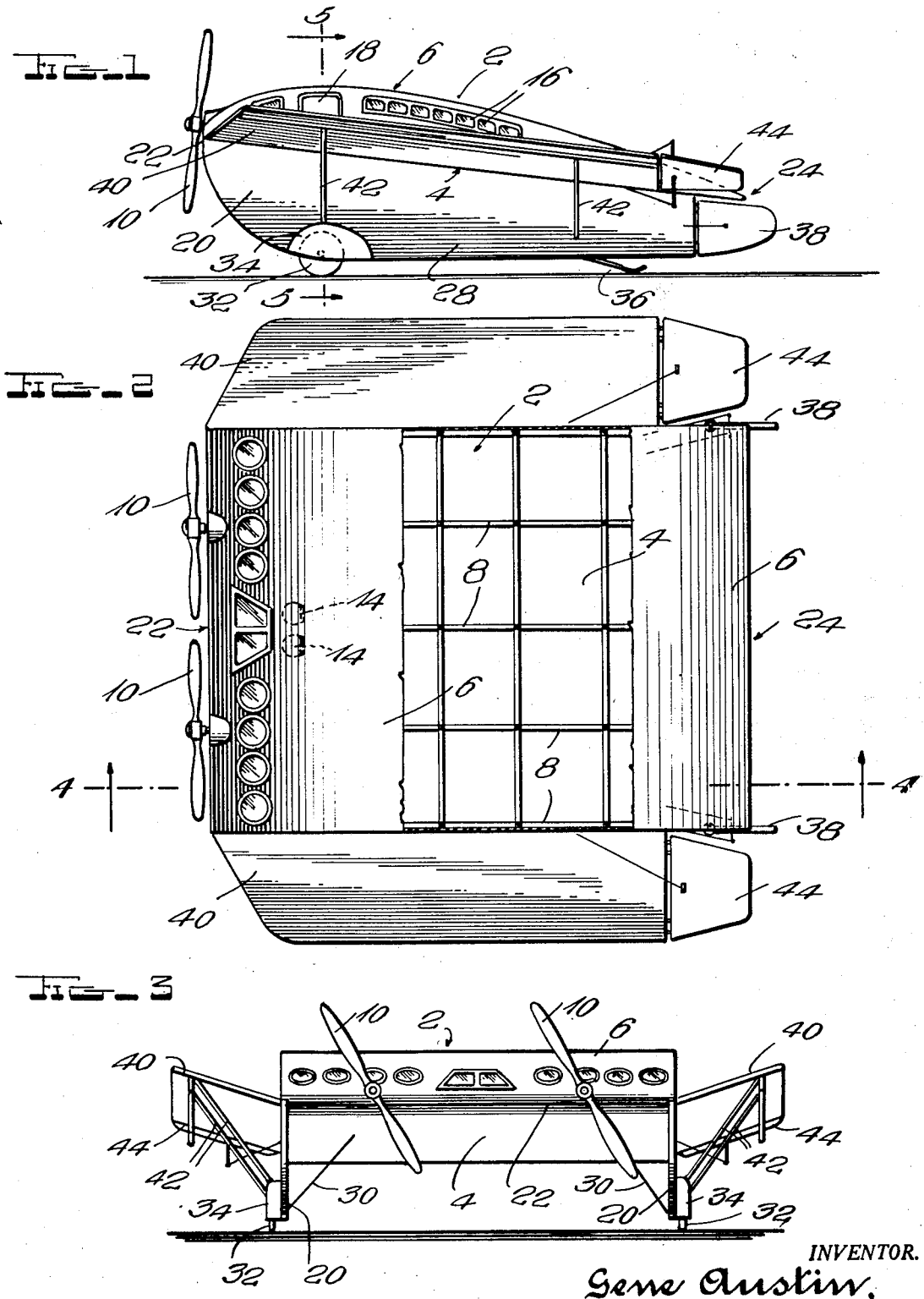

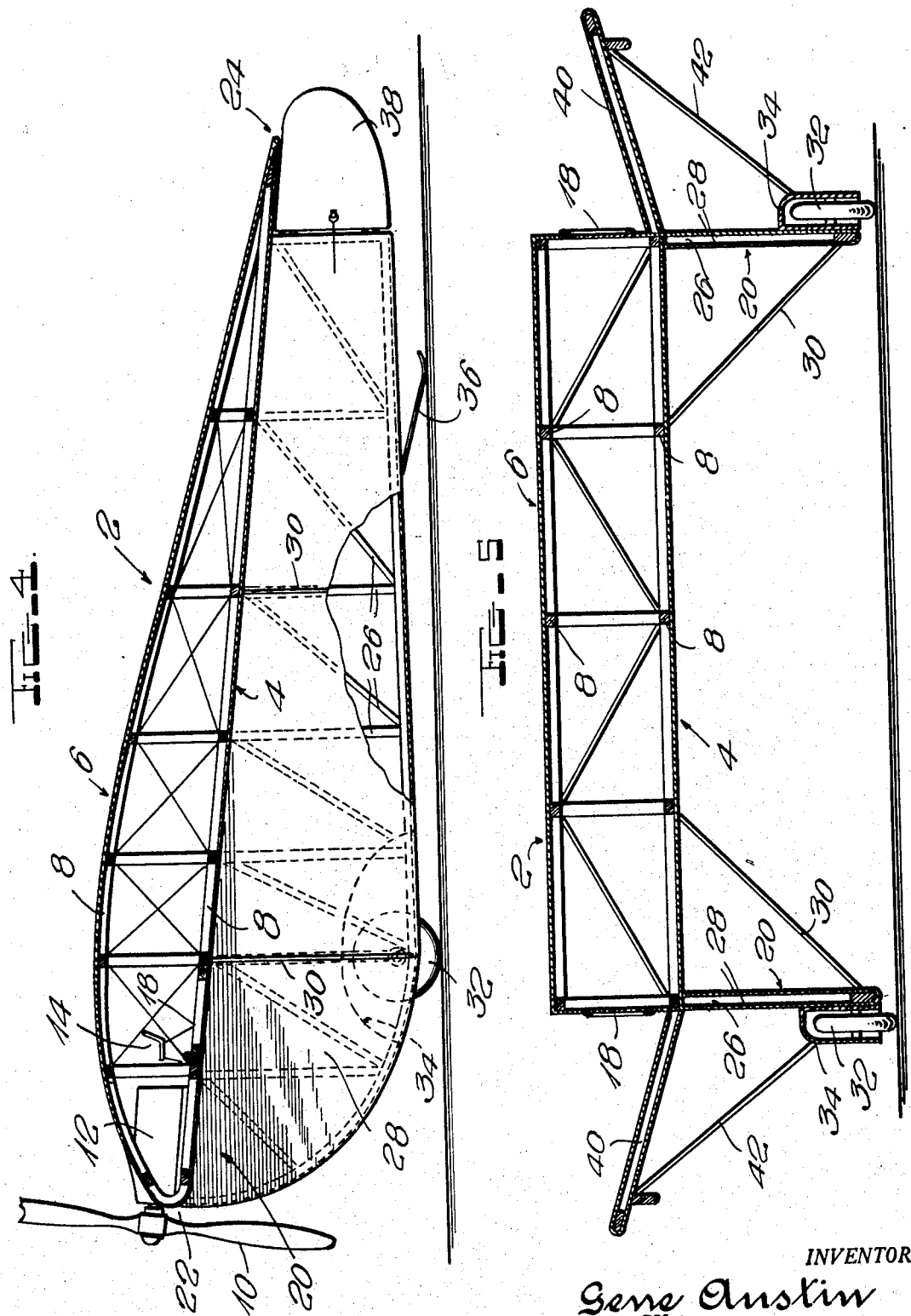

1,980,246

UNITED STATES PATENT OFFICE 1,980,246

AIRPLANE SKY SLED

Gene Austin, Minden, La.

Application December 8, 1933, Serial No. 701,513

10 Claims. (Cl. 244—12)

This invention is an airplane having certain structural features such that it may appropriately be called a sky sled.

The trend of modern airplane design, particularly on account of the requirements for higher speed, is toward the minimizing of wind resistance by eliminating as far as possible projecting portions which cause eddying, burbling and drag, all of which waste power and cut down the speed of the ship. In the present invention, the main body portion of the airplane or sky sled is in the form of a thick aerofoil or wing, thick enough for containing within itself the passengers, pilot, fuel tanks, cargo and the like. The main aerofoil or wing is itself the body of the airplane and so it is not provided with the fuselage in rather general use today. In order to give sufficient longitudinal stability, the fore and aft dimension of the aerofoil is preferably at least as great, preferably greater, than its lateral dimension.

Another important feature of the sky sled is a plurality, preferably two, vertically positioned, substantially flat surfaces extending fore and aft, extending from the leading to the trailing edge of the aerofoil. These vertical surfaces effectively prevent side slip and in addition serve to support, at the lower edges thereof, wheels, skids, pontoons, or analogous landing devices. Vertical rudders are provided, preferably at the trailing edges of these surfaces.

Another important feature of the invention is a pair of supplementary balancing and supporting surfaces extending fore and aft, preferably coextensive with the main aerofoil and positioned along either edge thereof, extending upwardly and outwardly so as to make a dihedral angle with the main aerofoil. These supplementary supports give some lift, aid in providing automatic lateral balance and also aid in preventing side slip.

At the trailing edges of these supplementary surfaces are movable control surfaces, movable in the same direction, for steering the sled up and down, or movable in opposite directions, like ailerons, for preserving lateral stability. One or more tractor propellers are provided at the leading edge of the aerofoil.

The entire machine has very few projecting parts and so presents very little head resistance. It has considerable inherent lateral stability due to the supplementary dihedral surfaces; it may be readily controlled by the control surfaces mentioned above.

The main features of the invention having been thus described, reference will now be made to the accompanying drawings, illustrating the present preferred embodiment of the invention.

Figure 1 is a side elevation of my improved airplane or sky sled;

Figure 2 is a plan view, parts being broken away and in section;

Figure 3 is a front view;

Figure 4 is a central, vertical, longitudinal section, on an enlarged scale, on the line 4—4 of Fig. 2; and Figure 5 is a transverse, vertical section, on an enlarged scale, on the line 5—5 of Fig. 1.

Referring now to these drawings, wherein similar reference characters indicate similar parts, the body of the airplane, indicated at 2, is in the shape of an aerofoil, the camber of the lower and upper surfaces being in accord with standard practice for giving a maximum lift for the speed at which the ship is designed to fly. The lower surface 4 is nearly flat while the upper surface 6 is cambered in the usual way. In order to provide sufficient longitudinal stability, the fore and aft dimension of the aerofoil is preferably greater than its lateral dimension.

The aerofoil 2 is braced with the large rigid ribs 8 and is provided with one or more tractor propellers 10 driven by motors 12 contained within the aerofoil. Seats for passengers and pilot are indicated at 14. Dual control is preferably provided, as is known in this art. The rest of the space in the aerofoil is large enough for housing fuel tanks and for providing additional cargo space. Windows 16 are provided along the leading and lateral edges of the main aerofoil and one or more hatches 18 is provided for loading and unloading.

Substantially coextensive with the aerofoil 2 is a plurality, preferably two, vertically positioned surfaces 20 extending fore and after substantially from the leading edge 22 of the aerofoil to its trailing edge 24. These surfaces are formed by light, strong framing members 26 which are covered with a suitable light covering 28. These surfaces 20 are strongly braced by stream lined diagonal struts 30 and carry near their forward ends landing wheels, pontoons or the like 32 provided with stream lined hoods 34 and are provided near their rear ends with skids, wheels or pontoons 36. It will, therefore, be seen that these vertical surfaces 20 not only carry the landing gear, but will also effectively prevent side slip. Vertical rudders 38, operated by foot bars, are provided at the trailing edges of these surfaces 20, for lateral steering, as is well understood in this art.

Substantially at the lateral edges of the main aeroplane 2 and substantially coextensive therewith, is a pair of upwardly and outwardly extending supporting surfaces 40 which may be braced by struts 42, for example, and which also extend from substantially the leading edge to the trailing edge of the main aerofoil.

These supplementary surfaces 40 form substantially a dihedral angle with the main aerofoils and another dihedral angle with the vertical surfaces 20. They give a certain amount of lift, provide considerable inherent lateral stability due to the dihedral effect, and also aid in preventing side slip.

Movable control surfaces 44 are provided at the trailing edges of the supplementary surfaces 40 and these are arranged, as is known in the art, to be operated up and down simultaneously in the same direction, like elevators, for controlling the fore and aft balance of the ship and for controlling its ascent and descent, and arranged to be movable simultaneously in opposite directions, like ailerons, for controlling the lateral balance.

There is thus provided an airplane or sky sled having very little wind resistance, inherent lateral stability, means for preventing side slip, a minimum of projecting parts for creating air resistance, and a large passenger and cargo carrying capacity.

While the preferred embodiment of the invention has been described in some detail, it should be understood that the invention is not limited to the precise structure here described, but may be carried out in other ways as falling within the scope of the claims.

Having thus described my invention, I claim:—

1. A sky sled comprising an aerofoil of the thick wing type for carrying within itself the pilot, passengers, etc., a plurality of vertically disposed, substantially flat surfaces extending fore and aft and substantially coextensive with the aerofoil, alighting means carried by the lower edges of said vertical surfaces, and a pair of supplementary surfaces, substantially coextensive with the aerofoil, extending upwardly and outwardly from the side edges of the aerofoil to give a dihedral effect.

2. A sky sled comprising an aerofoil of the thick wing type for carrying within itself the pilot, passengers etc., a plurality of vertically disposed, substantially flat surfaces extending fore and aft and substantially coextensive with the aerofoil, alighting means carried by the lower edges of said vertical surfaces, vertical rudders at the rear edges of said vertical surfaces, and a pair of supplementary surfaces, substantially coextensive with the aerofoil, extending upwardly and outwardly from the side edges of the aerofoil to give a dihedral effect.

3. A sky sled comprising an aerofoil of the thick wing type for carrying within itself the pilot, passengers etc., a plurality of vertically disposed, substantially flat surfaces extending fore and aft and substantially coextensive with the aerofoil, alighting means carried by the lower edges of said vertical surfaces, a pair of supplementary surfaces, substantially coextensive with the aerofoil, extending upwardly and outwardly from the side edges of the aerofoil to give a dihedral effect and control surfaces movably mounted at the trailing edges of said supplementary surfaces.

4. A sky sled comprising an aerofoil of the thick wing type for carrying within itself the pilot, passengers etc., a plurality of vertically disposed, substantially flat surfaces extending fore and aft and substantially coextensive with the aerofoil, alighting means carried by the lower edges of said vertical surfaces, vertical rudders at the rear edges of said vertical surfaces, a pair of supplementary supporting and balancing surfaces, substantially coextensive with the aerofoil, extending upwardly and outwardly from the side edges of the aerofoil to give a dihedral effect, and control surfaces mounted at the trailing edges of the supplementary surfaces and movable in the same or opposite directions, for effecting the fore and aft and lateral control of the machine.

5. A sky sled comprising a thick wing aerofoil for carrying within itself substantially all the load, tractor propellers mounted substantially at the leading edge of the aerofoil, a pair of vertically disposed surfaces extending fore and aft, coextensive with the aerofoil, alighting means carried by the lower edges of said vertical surfaces, a pair of supplementary supporting and balancing surfaces, extending upwardly and outwardly from the side edges of the aerofoil, vertical rudders mounted at the rear edges of said vertical surfaces, and control surfaces for fore and aft and lateral balance, mounted at the trailing edges of said supplementary surfaces.

6. An airplane, comprising a combined body portion and lifting surface having the camber of an aerofoil and of substantial thickness, for containing within itself substantially all the useful load, the fore and aft dimension of the lifting surface being at least as great as its lateral dimension, a pair of vertically disposed, substantially flat surfaces extending fore and aft and positioned substantially at the outer edges of the aerofoil and substantially coextensive therewith, and alighting devices carried by the lower edges of said vertical surfaces.

7. An airplane, comprising a combined body portion and lifting surface having the camber of an aerofoil and of substantial thickness, for containing within itself substantially all the useful load, the fore and aft dimension of the lifting surface being at least as great as its lateral dimension, a pair of vertically disposed, substantially flat surfaces extending fore and aft and positioned substantially at the outer edges of the aerofoil and substantially coextensive therewith, vertical rudders positioned at the rear edges of said vertical surfaces, and alighting devices carried by the lower edges of said vertical surfaces.

8. An airplane, comprising a combined body portion and lifting surface having the camber of an aerofoil and of substantial thickness, for containing within itself substantially all the useful load, the fore and aft dimension of the lifting surface being at least as great as its lateral dimension, a pair of vertically disposed, substantially flat surfaces extending fore and aft and positioned substantially at the outer edges of the aerofoil and substantially coextensive therewith, a pair of supplementary surfaces extending outwardly and upwardly from the outer side edges of the body portion and coextensive therewith, to give a dihedral effect, and control surfaces positioned at the trailing edges of said supplementary surfaces.

9. An airplane, comprising a combined body portion and lifting surface having the camber of an aerofoil and of substantial thickness, for containing within itself substantially all the useful load, the fore and aft dimension of the lifting surface being at least as great as its lateral dimension, a pair of vertically disposed, substantially flat surfaces extending fore and aft and positioned substantially at the outer edges of the aerofoil and substantially coextensive therewith, alighting devices carried by the lower edges of said vertical surfaces, a pair of supplementary surfaces extending outwardly and upwardly from the outer, side edges of the body portion and coextensive therewith, to give a dihedral effect, and control surfaces positioned at the trailing edges of said supplementary surfaces and movable in the same or opposite directions for fore and aft, or lateral, control of the plane.

10. An airplane, comprising a combined body portion and lifting surface having the camber of an aerofoil and of substantial thickness, for containing within itself substantially all the useful load, the fore and aft dimension of the lifting surface being at least as great as its lateral dimension, a pair of vertically disposed, substantially flat surfaces extending fore and aft and positioned substantially at the outer edges of the aerofoil and substantially coextensive therewith, alighting devices carried by the lower edges of said vertical surfaces, vertical rudders positioned at the rear edges of said vertical surfaces, a pair of supplementary surfaces extending outwardly and upwardly from the outer, side edges of the body portion and coextensive therewith, to give a dihedral effect, control surfaces positioned at the trailing edges of said supplementary surfaces and movable in the same or opposite directions for fore and aft, or lateral, control of the plane.

GENE AUSTIN.